(12) United States Patent
Omori

(10) Patent No.: US 7,076,765 B1
(45) Date of Patent: Jul. 11, 2006

(54) SYSTEM FOR HIDING RUNTIME ENVIRONMENT DEPENDENT PART

(75) Inventor: Mari Omori, Fucu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/261,126

(22) Filed: Mar. 3, 1999

(30) Foreign Application Priority Data

Jun. 24, 1998 (JP) .................................. 10-177259

(51) Int. Cl.
G06F 9/44 (2006.01)
G06F 9/45 (2006.01)

(52) U.S. Cl. ...................... 717/121; 717/122; 717/165

(58) Field of Classification Search ................ 717/107, 717/108, 116, 120, 121, 122, 148, 162, 165, 717/166, 11, 169–170; 713/1
See application file for complete search history.

(56) References Cited

U.S. PATENT DOCUMENTS

| | | | | |
|---|---|---|---|---|
| 5,583,983 | A * | 12/1996 | Schmitter | 717/138 |
| 5,996,073 | A * | 11/1999 | Lee et al. | 713/1 |
| 6,006,034 | A * | 12/1999 | Heath et al. | 717/170 |
| 6,009,517 | A * | 12/1999 | Bak et al. | 712/245 |
| 6,074,432 | A * | 6/2000 | Guccione | 717/108 |
| 6,117,187 | A * | 9/2000 | Staelin | 717/169 |
| 6,272,673 | B1 * | 8/2001 | Dale et al. | 717/100 |
| 6,366,876 | B1 * | 4/2002 | Looney | 703/25 |
| 6,442,753 | B1 * | 8/2002 | Gerard et al. | 717/170 |
| 6,513,153 | B1 * | 1/2003 | Lee | 717/100 |

FOREIGN PATENT DOCUMENTS

| EP | 848325 A2 * | 6/1998 |
|---|---|---|
| GB | 2316200 A * | 2/1998 |

OTHER PUBLICATIONS

SunSoft; "Object Services: Working in Concert"; Sun Microsystems, Inc.; 1993; pp. 6-7.*
JDK 1.1 Internationalization Specification; Sun Microsystems, Inc.; http://java.sun.com/products/jdk/1.1/intl/html/intlspecTOC.doc.html; (1996).

* cited by examiner

*Primary Examiner*—Kakali Chaki
*Assistant Examiner*—William H. Wood
(74) *Attorney, Agent, or Firm*—Finnegan, Henderson, Farabow, Garrett & Dunner, L.L.P.

(57) ABSTRACT

This invention provides a runtime environment dependency hiding apparatus and the like, which hides a part that depends on the runtime environment in software which runs on a plurality of runtime environments having different specifications. An environment information acquisition unit acquires environment information that pertains to the runtime environment of a Java program from standard properties and the like. A dependence information generation unit generates a dependence information list required for processing the part that depends on the runtime environment in the Java program on the basis of dependence information generation information. A search key generation unit generates a search key in accordance with search key generation knowledge on the basis of the environment information acquired by the environment information acquisition unit. A dependence information search unit searches the dependence information list generated by the dependence information generation unit for dependence information corresponding to the current runtime environment on the basis of the search key generated by the search key generation unit. A process execution unit executes the processing of the part that depends on the runtime environment on the basis of the dependence information obtained by the dependence information search unit.

34 Claims, 16 Drawing Sheets

```
public class example{
    static{
        system.loadLiblary("lib_for_native");
    }
    public native void show();
}
```

```
// ACQUIRE java.vendor PROPERTY                                      ⎫
String vendor=system.getProperty("java.vendor");                     ⎬ A
if( vendor.startsWith("Microsoft") ){ // IF STARTING FROM "Microsoft"⎭
    system.loadLibrary("MS");         // LOAD SHARED LIBRARY FOR Microsoft  ⎫
}else if( vendor.startsWith("Sun Microsystems") ) {                          ⎬ B
    System.loadLibrary("SUN");                                               ⎪
}else if(...){                                                               ⎭
    ...
}
```

FIG. 18

SYSTEM FOR HIDING RUNTIME ENVIRONMENT DEPENDENT PART

BACKGROUND OF THE INVENTION

1. Field of the Invention

The present invention relates to software which can run on a plurality of environments having different specifications and, more particularly, to a runtime environment dependency hiding apparatus and method which can achieve easy maintenance and high re-usability of software by hiding a part that depends on the runtime environment in software to make it invisible, and a computer readable recording medium that records a runtime environment dependency hiding program.

2. Related Background Art

Since source code of software is normally converted by a compiler into that in a runtime format premised on an operating system, peripheral devices, command sets unique to a CPU, and the like, the runtime format generated from source code depends on the platform such as an operating system and the like.

Since such platform dependence of software is a serious bottleneck upon development and distribution of versatile software, system development using Java (tradename) language has prevailed recently. Source code of a Java program developed using the Java language is converted by a compiler into intermediate code format called bytecode, and the bytecode is executed by a Java interpreter which runs on a VM (Virtual Machine). For this reason, when VMs are prepared in units of platforms, the runtime format (bytecode) is independent from any single platform.

However, since there are a plurality of specifications of VMs that execute Java programs and a plurality of specifications of WWW (World Wide Web) browsers that execute Java applets as a kind of Java program, the actual Java program depends on the runtime environment of, e.g., a VM.

Platform dependence of a Java program will be explained taking as an example a Java program executed by a VM that runs on an operating system. There are two major VMs that execute Java programs:

(1) a VM (JDK VM) complying with the JDK (Java Development Kit) available from Sun Microsystems Inc.; and (2) a VM (MS VM) available from Microsoft Corp. (which is not fully compatible with the JDK).

These VMs use different specifications of native method interfaces which define rules that establish correspondence between a program described in the Java language and a program described in other languages such as C, C++, and the like.

FIG. 15 shows an example of coding of a Java program that uses the native method interface, and FIG. 16 is an explanatory view of the native method interface. Referring to FIG. 15, source code (Java code) of a Java program that uses a program (native code) described in another language contains: a description (system.loadLibrary("lib_for_native");) that loads a shared library (embedded in other languages such as C, C++, and the like) that stores native code fragments corresponding to native methods; and a description (public native void show( );) that declares a given method as a native method. Note that as shown in FIG. 16, the method declared as the native method calls corresponding native code from the shared library loaded into the Java program via the native method interface upon execution.

In the native method interface, rules that pertain to the way of describing native code are defined in detail so as to allow native code to exchange information with Java code. Such rules include:

(1) a naming rule between the native method and the functions of the native code; and (2) functions used for accessing Java objects from native code; and so on.

The native method interface is provided by a VM, but its kind varies depending on the kinds of VMs. However, when both the aforementioned JDK VM and MS VM use the native method interface, JNI (Java Native Interface) is used in case of the JDK VM; RNI (Raw Native Interface) is used in case of the MS VM, thus commonizing Java code, as shown in FIG. 15.

However, in either native method interface of the JNI and RNI, a shared library that stores a native code fragment must be loaded into a Java program before native code is used. Since the description style of native code varies depending on the kinds of native method interfaces, different shared libraries must be prepared in correspondence with different kinds of native method interfaces (JNI and RNI), and the shared library name to be loaded must be switched in correspondence with the kind of the runtime VM, as shown in FIG. 17.

FIG. 18 shows an example of coding of a Java program upon switching the shared library name to be loaded in correspondence with the kind of VM. In a Java program shown in FIG. 18, after the value of a "java.vendor" property as one of system properties is acquired (see field (A) in FIG. 18), the kind of VM is checked based on the acquired value using an "if" statement, and the shared library name to be loaded is switched on the basis of the checking result (see field (B) in FIG. 18). Note that the system properties correspond to environment variables used in an operating system or the like, and include standard system properties (standard properties) given upon execution, and non-standard system properties (non-standard properties) that can be set as needed. The standard properties include a "java.vendor" property, "os.name" property, and the like corresponding to the vendor name of the runtime VM, the operating system name, and the like, and the values of these standard properties are acquired by a "getProperty" method of a "java.lang.System" class contained in a standard class library of the Java language. On the other hand, a shared library specified based on the value of the standard property is loaded into the Java program by a "loadlibrary" method of the "java.lang.System" class contained in the standard class library of the Java language.

As described above, in a Java program that uses the native method interface, a part for switching the shared library name to be loaded in correspondence with the kind of VM is implemented by a conditional description ("if" statement) in Java code.

However, in such a Java program, since information ("Microsoft", "SUN Microsystems") as a basis for switching decision, the shared library name ("MS", "SUN") to be loaded, and the like are directly written in Java code (see the italics in FIG. 18), re-compiling is required every time information as a basis for switching decision, the shared library name, and the like are added/changed, resulting in poor maintenance and re-usability.

For example:

(1) When another company (A company) other than Sun Microsystems, Inc. and Microsoft Corp. provides a new VM, a new conditional description that determines the kind of VM provided by A company and switches the shared library name to be loaded must be added.

(2) When Microsoft Corp. changes its policy so as to support the JNI as a native method interface in place of the RNI, the shared library name as a result of checking the kind of VM provided by Microsoft Corp. needs to be changed.

In order to reflect the addition/change in the above-mentioned cases (1) and (2) in a Java program, Java code must be modified and re-compiled into a runtime format (bytecode).

SUMMARY OF THE INVENTION

The present invention has been made in consideration of the above situation, and has as its object to provide a runtime environment dependency hiding apparatus and method which can easily change a part that depends on the runtime environment and avoid necessity of re-compiling by hiding a part that depends on the runtime environment in software such as a Java program or the like which runs on a plurality of runtime environments having different specifications, thereby improving maintenance and re-usability of software, and a computer readable recording medium that records a runtime environment dependency hiding program.

The first feature of the present invention is a runtime environment dependency hiding apparatus comprising: an environment information acquisition unit for acquiring environment information that pertains to a runtime environment of software which runs on a computer system; a dependence information generation unit for generating at least one dependence information candidate required for processing a part that depends on the runtime environment in the software; a dependence information search unit for searching the dependence information candidate generated by the dependence information generation unit for dependence information that pertains to a current runtime environment on the basis of the environment information acquired by the environment information acquisition unit; and a process execution unit for executing the processing of the part that depends on the runtime environment on the basis of the dependence information obtained by the dependence information search unit. Note that in the first feature of the present invention, the apparatus preferably further comprises a search key generation unit for generating a search key in accordance with predetermined search generation knowledge on the basis of the environment information acquired by the environment information acquisition unit, and the dependence information search unit searches the dependence information candidate generated by the dependence information generation unit for dependence information corresponding to the current runtime environment on the basis of the search key generated by the search key generation unit.

The second feature of the present invention is a runtime environment dependency hiding method comprising the steps of: acquiring environment information that pertains to a runtime environment of software which runs on a computer system; generating at least one dependence information candidate required for processing a part that depends on the runtime environment in the software; searching the generated dependence information candidate for dependence information that pertains to a current runtime environment on the basis of the acquired environment information; and executing the processing of the part that depends on the runtime environment on the basis of the obtained dependence information. Note that in the second feature of the present invention, the method preferably further comprises the step of generating a search key in accordance with predetermined search generation knowledge on the basis of the acquired environment information, and the generated dependence information candidate is searched for dependence information corresponding to the current runtime environment on the basis of the generated search key.

The third feature of the present invention is a computer readable recording medium recording a runtime environment dependency hiding program, which makes a computer the sequences of: acquiring environment information that pertains to a runtime environment of software which runs on a computer system; generating at least one dependence information candidates required for processing a part that depends on the runtime environment in the software; and searching the generated dependence information candidate for dependence information that pertains to a current runtime environment on the basis of the acquired environment information. Note that in the third feature of the present invention, the program preferably further make the computer a sequence of generating a search key in accordance with predetermined search generation knowledge on the basis of the acquired environment information, and the sequence of searching the dependence information includes a sequence of searching the generated dependence information candidates for dependence information corresponding to the current runtime environment on the basis of the generated search key. Also, in the third feature of the present invention, the program preferably further make the computer a sequence of executing the processing of the part that depends on the runtime environment on the basis of the obtained dependence information.

The fourth feature of the present invention is a computer readable recording medium recording a runtime environment dependency hiding program that hides processing of a part that depends on the runtime environment of software which runs on a computer system, the program including: a component of acquiring desired environment information that pertains to a runtime environment of the software by receiving external information which describes an acquisition target element name indicating environment information to be acquired; and a component of searching for dependence information corresponding to a current runtime environment on the basis of the desired environment information acquired by the component by receiving external information which describes at least one dependence information candidate required for processing the part that depends on the runtime environment of the software together with environment information.

According to the first to third features of the present invention, since at least one dependence information candidate required for processing a part that depends on the runtime environment in software are separately prepared without being embedded in software, and dependence information corresponding to the current runtime environment is dynamically acquired from the dependence information candidates on the basis of environment information that pertains to the runtime environment of software, the part that depends on the runtime environment can be easily changed, and necessity of re-compiling can be avoided, thus improving maintenance and re-usability of software.

According to the fourth feature of the present invention, in addition to the first to third features mentioned above, since acquisition target element names indicating environment information to be used upon selecting a dependence information candidate are separately prepared without being embedded in software, and environment information to be acquired is dynamically acquired, the part that depends on the runtime environment can be further easily changed.

BRIEF DESCRIPTION OF THE DRAWINGS

The preferred embodiments of the present invention will be described hereinafter with reference to the accompanying drawings. In the drawings.

FIG. 18 shows an example of coding of a Java program upon switching the shared library to be loaded in correspondence with the kind of VM upon using a native method interface.

DESCRIPTION OF THE PREFERRED EMBODIMENTS

Figure 1:
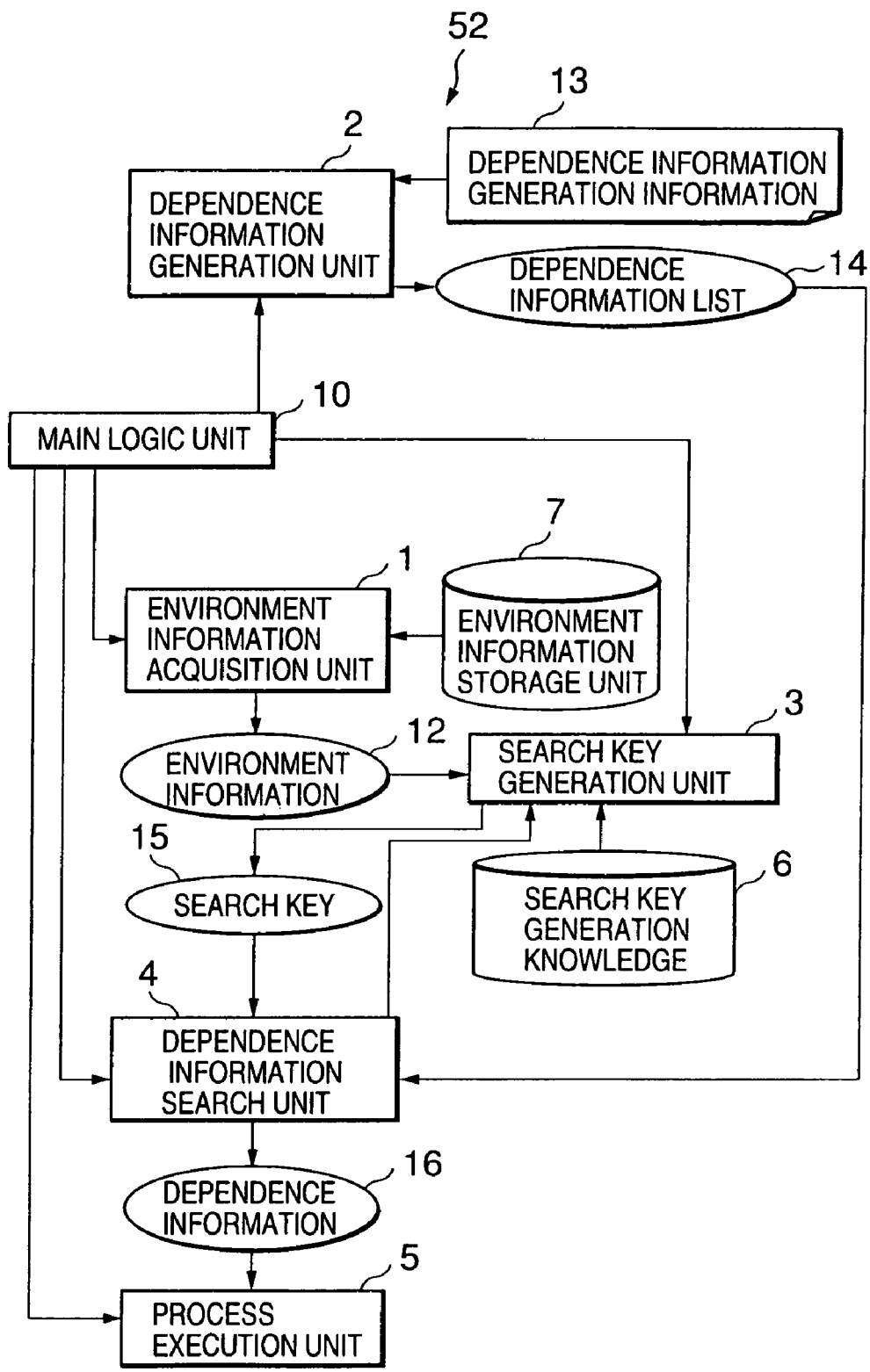
FIG. 1 is a functional block diagram showing an embodiment of a runtime environment dependency hiding apparatus according to the present invention.
Figure 2:
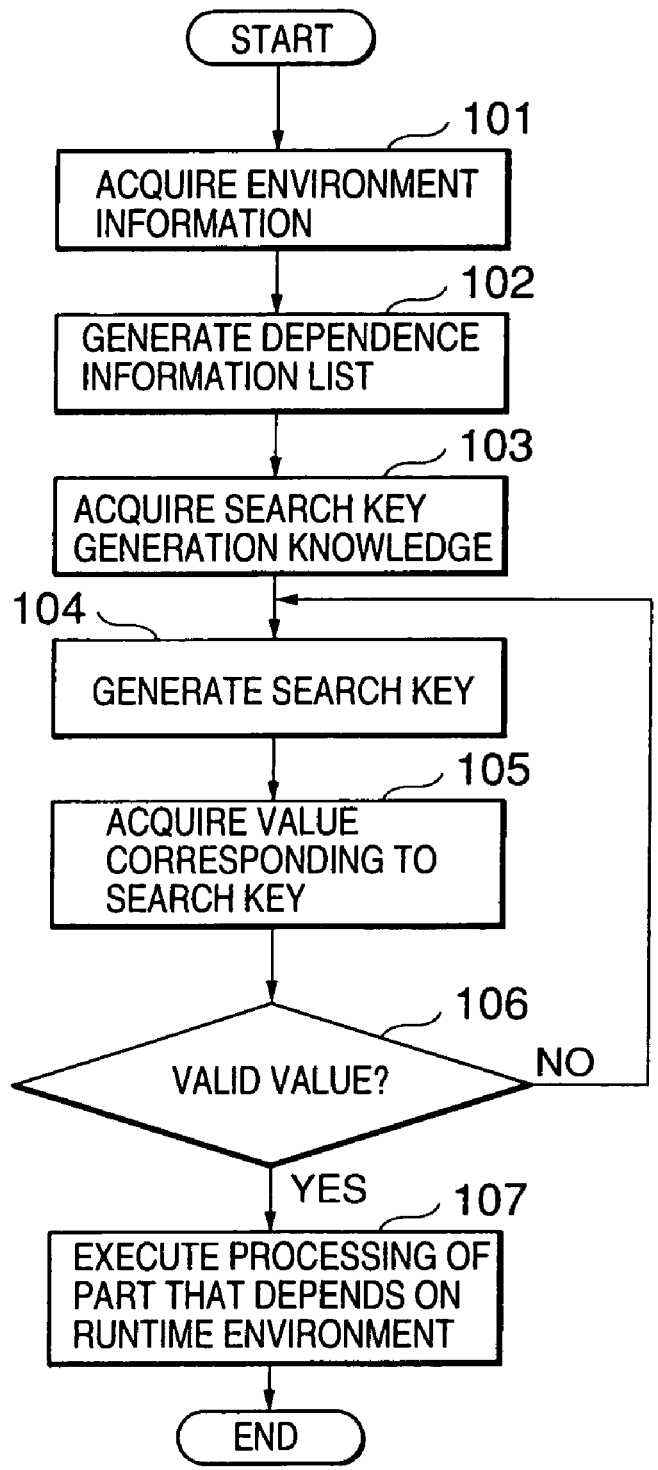
FIG. 2 is a flow chart for explaining the operation of the runtime environment dependency hiding apparatus shown in FIG. 1.
Figure 14:
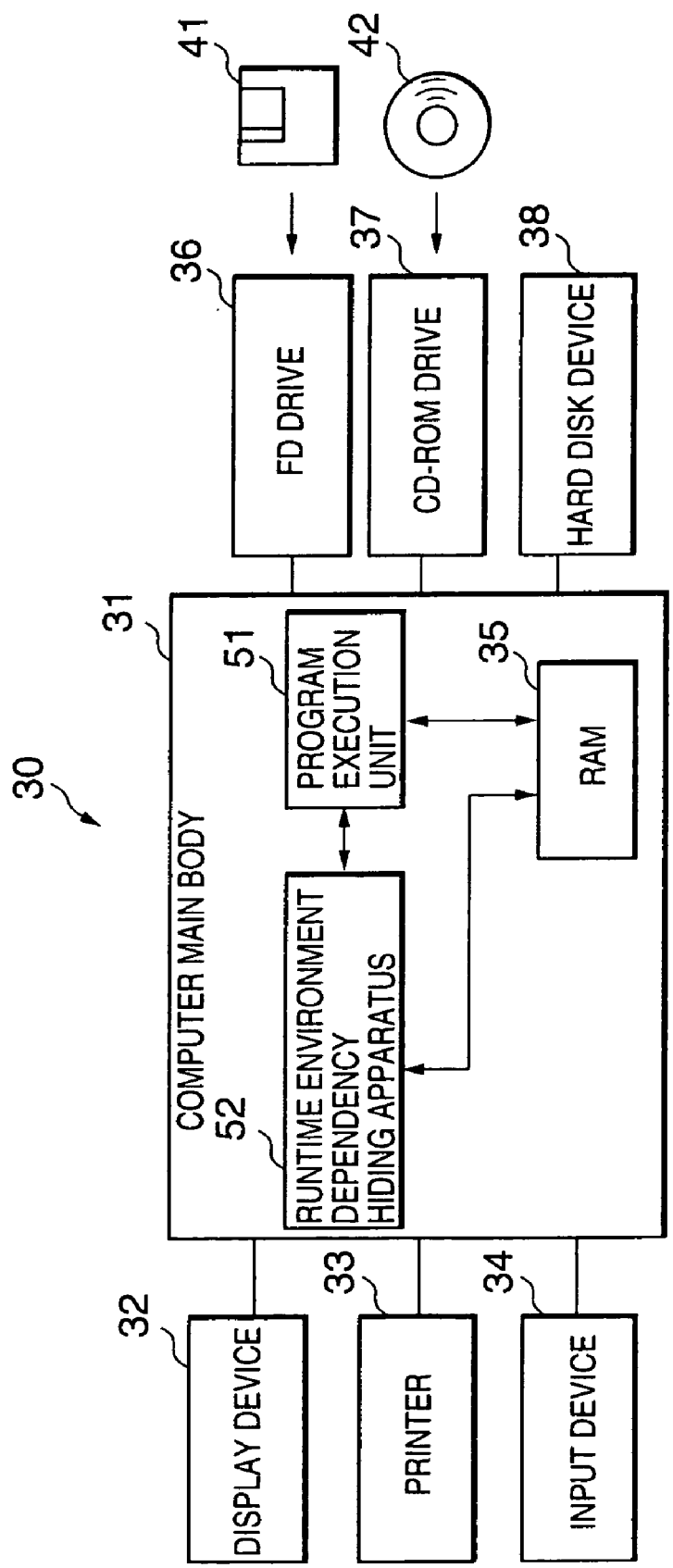
FIG. 14 is a block diagram showing the hardware arrangement of a computer system using a built-in runtime environment dependency hiding apparatus according to the present invention.
Figures 15, 16:
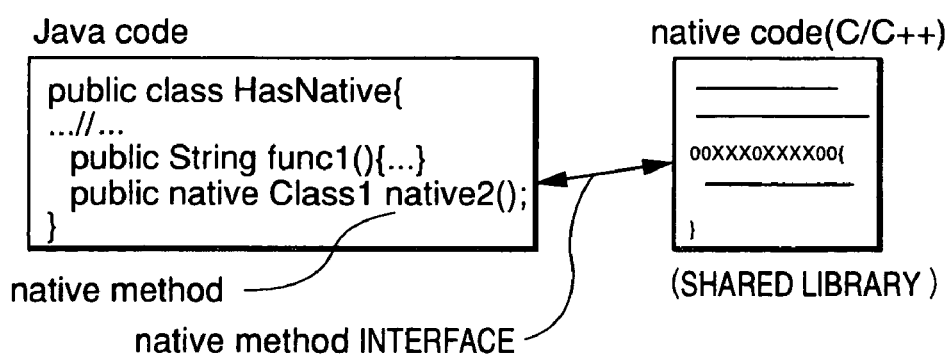
FIG. 15 shows an example of coding of a Java program that uses a native method interface.
FIG. 16 is a schematic view for explaining the native method interface used in a Java program.
Figure 17:
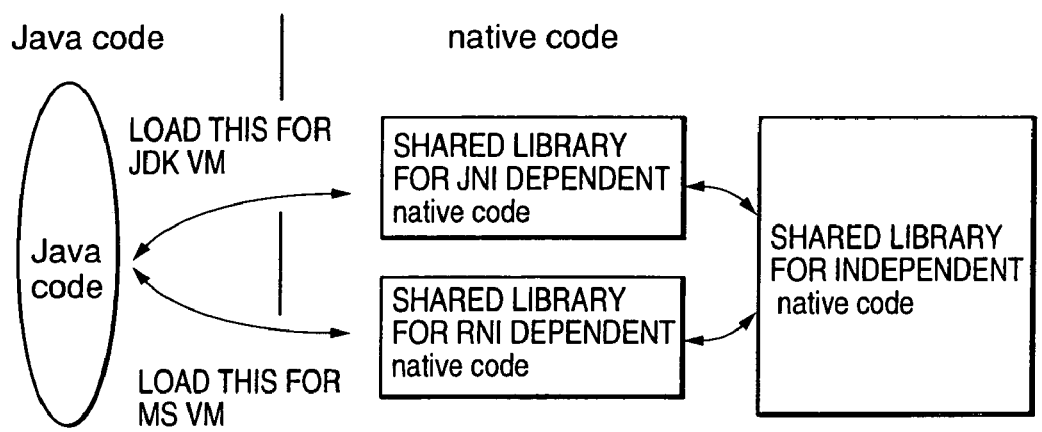
FIG. 17 is a view for explaining the relationship between VMs that execute Java programs and native method interfaces.

FIGS. 1, 2, and 14 show an embodiment of a runtime environment dependency hiding apparatus according to the present invention.

As shown in FIG. 14, a runtime environment dependency hiding apparatus 52 in this embodiment is built in a computer main body 31 of a computer system 30, and is used. The apparatus 52 operates while exchanging data, control signals, and the like with a program execution unit 51 and RAM (Random Access Memory) 35 of the computer main body 31. Note that the computer system 30 comprises various peripheral devices such as a display device 32 such as a CRT (Cathode Ray Tube), or the like, a printer 33, an input device 34 such as a keyboard, mouse, and the like, an FD (floppy disk) drive 36, a CD-ROM (Compact Disk-Read Only Memory) drive 37, a hard disk device 38, and the like, in addition to the computer main body 31.

The arrangement and operation of the runtime environment dependency hiding apparatus 52 will be explained taking as an example a case wherein a predetermined Java program runs on the program execution unit 51 of the computer main body 31 in the computer system 30 shown in FIG. 14.

As shown in FIG. 1, the runtime environment dependency hiding apparatus 52 comprises an environment information acquisition unit 1, dependence information generation unit 2, search key generation unit 3, dependence information search unit 4, and process execution unit 5. These units are controlled by a main logic unit 10.

The environment information acquisition unit 1 acquires environment information 12 that pertains to the runtime environment of the Java program from an environment information storage unit 7 which stores standard properties as standard system properties given upon execution of the Java program, externally input information, and the like. The environment information storage unit 7 is implemented on a recording medium such as a RAM, hard disk device, or the like. The environment information storage unit 7 stores, e.g., the vendor name of the VM, operating system name, WWW browser version, information pertaining to the user name, linked database name, information that pertains to the peripheral device names, and the like. Note that information that pertains to the linked database name, peripheral device names, and the like can be loaded as a text file via an input device such as a keyboard, or an argument upon starting a program.

The dependence information generation unit 2 generates a dependence information list (dependence information candidates) 14 required for processing a part that depends on the runtime environment in the Java program, on the basis of dependence information generation information 13. The dependence information generation unit 2 receives, as the dependence information generation information 13, information that pertains to the shared library name of a native method interface as a part that depends on the runtime environment in the Java program, information that pertains to the linked database and driver selection corresponding to peripheral devices, and the like. Note that the dependence information generation information 13 is loaded as a text file via the input device such as a keyboard, or an argument upon starting a program. The dependence information generation information 13 may also be designated by the interactive operations of a user through a user interface. Then, the dependence information generation information 13 is stored on a recording medium such as a RAM, hard disk device, or the like. On the other hand, the dependence information list 14 generated by the dependence information generation unit 2 is stored as a non-standard property list as non-standard system properties that can be set as needed, layout, or the like on a recording medium such as a RAM, hard disk device, or the like.

The search key generation unit 3 generates a search key 15 in accordance with predetermined search key generation knowledge 6 on the basis of the environment information 12 acquired by the environment information acquisition unit 1. In the search key generation unit 3, the search key 15 is generated as a character string using a combination of environment information acquired by the environment information acquisition unit 1. For example, when the dependent information list 14 is stored as a non-standard property list, a non-standard property name is generated as the search key 15. Note that the search key generation knowledge 6 is implemented on a recording medium such as a RAM, hard disk device, or the like.

The dependence information search unit 4 searches the dependence information list 14 generated by the dependence information generation unit 2 for dependence information 16 corresponding to the current runtime environment on the basis of the search key 15 generated by the search key generation unit 3.

The process execution unit 5 executes the processing of the part that depends on the runtime environment on the basis of the dependence information 16 obtained by the dependence information search unit 4. More specifically, processes, for example, loading of a shared library of a native method interface as a part that depends on the runtime environment in the Java program, driver selection corresponding to the linked database or peripheral devices, and the like are executed.

The operation of this embodiment with the above arrangement will be explained below with reference to FIGS. 1 and 2.

When the Java program is executed by a VM that is running on the operating system, the environment information acquisition unit 1 acquires environment information 12 that pertains to the runtime environment of the Java program from the environment information storage unit 7 (step 101).

The dependence information generation unit 2 generates a dependence information list 14 required for processing the part that depends on the runtime environment in the Java program on the basis of dependence information generation information 13 loaded as a text file or an argument upon starting the program. (step 102).

The search key generation unit 3 acquires the search key generation knowledge 6 (step 103), and then generates a search key 15 in accordance with the search key generation knowledge 6 on the basis of the environment information 12 acquired by the environment information acquisition unit 1 (step 104).

The dependence information search unit 4 searches the dependence information list 14 generated by the dependence information generation unit 2 for dependence information 16 corresponding to the current runtime environment on the basis of the search key 15 generated by the search key generation unit 3. More specifically, after the value corresponding to the search key 15 is acquired from the dependence information list 14 (step 105), it is checked if the acquired value is valid (step 106). In this way, a search is sequentially done using the search key 15 generated by the search key generation unit 3 until the valid value (dependence information 16) is found (steps 104 to 106).

When a valid value (dependence information 16) is found, the process execution unit 5 executes the processing of a part that depends on the runtime environment on the basis of the dependence information 16 obtained by the dependence information search unit 4 (step 107).

Note that the processes in steps 101, 102, and 103 are independent from each other, and can be executed in an arbitrary order or at the same time up to step 104.

As described above, according to this embodiment, since the dependence information list 14 required for processing a part that depends on the runtime environment in the Java program is separately prepared without being embedded in the Java program, and the dependence information 16 corresponding to the current runtime environment is dynamically acquired from the dependence information list 14 on the basis of the environment information 12 that pertains to the runtime environment of the Java program, the part that depends on the runtime environment can be easily changed, and necessity of re-compiling can be avoided, thus improving maintenance and re-usability of software.

In the embodiment described above, the main logic unit 10 integrally controls the environment information acquisition unit 1, dependence information generation unit 2, search key generation unit 3, dependence information search unit 4, and process execution unit 5. Alternatively, independently of the main logic unit 10, the environment information acquisition unit 1, dependence information generation unit 2, search key generation unit 3, dependence information search unit 4, and process execution unit 5 may be separately controlled on the basis of data, control signals, and the like exchanged among these units.

In the above embodiment, the search key generation unit 3 generates the search key 15 in accordance with the predetermined search key generation knowledge 6 on the basis of the environment information 12 acquired by the environment information acquisition unit 1, and the dependence information 16 corresponding to the current runtime environment is retrieved from the dependence information list 14 on the basis of this search key. However, the present invention is not limited to such specific process. For example, the dependence information 16 corresponding to the current runtime environment may be retrieved from the dependence information list 14 using the environment information 12 acquired by the environment information acquisition unit 1 as a search key.

Furthermore, in the aforementioned embodiment, the environment information acquisition unit 1, dependence information generation unit 2, search key generation unit 3, dependence information search unit 4, process execution unit 5, and the like can be implemented by dedicated hardware, and can also be implemented by a program that runs on a CPU (Central Processing Unit) in the computer main body 31 shown in FIG. 14. The program implemented in this way is stored in various computer readable recording media such as a flexible disk 41, CD-ROM 42, RAM 35, hard disk device 38, and the like in the computer system 30, and is read out and executed by the CPU in the computer main body 31, thus implementing the aforementioned functions.

Another Embodiment

Figure 3:
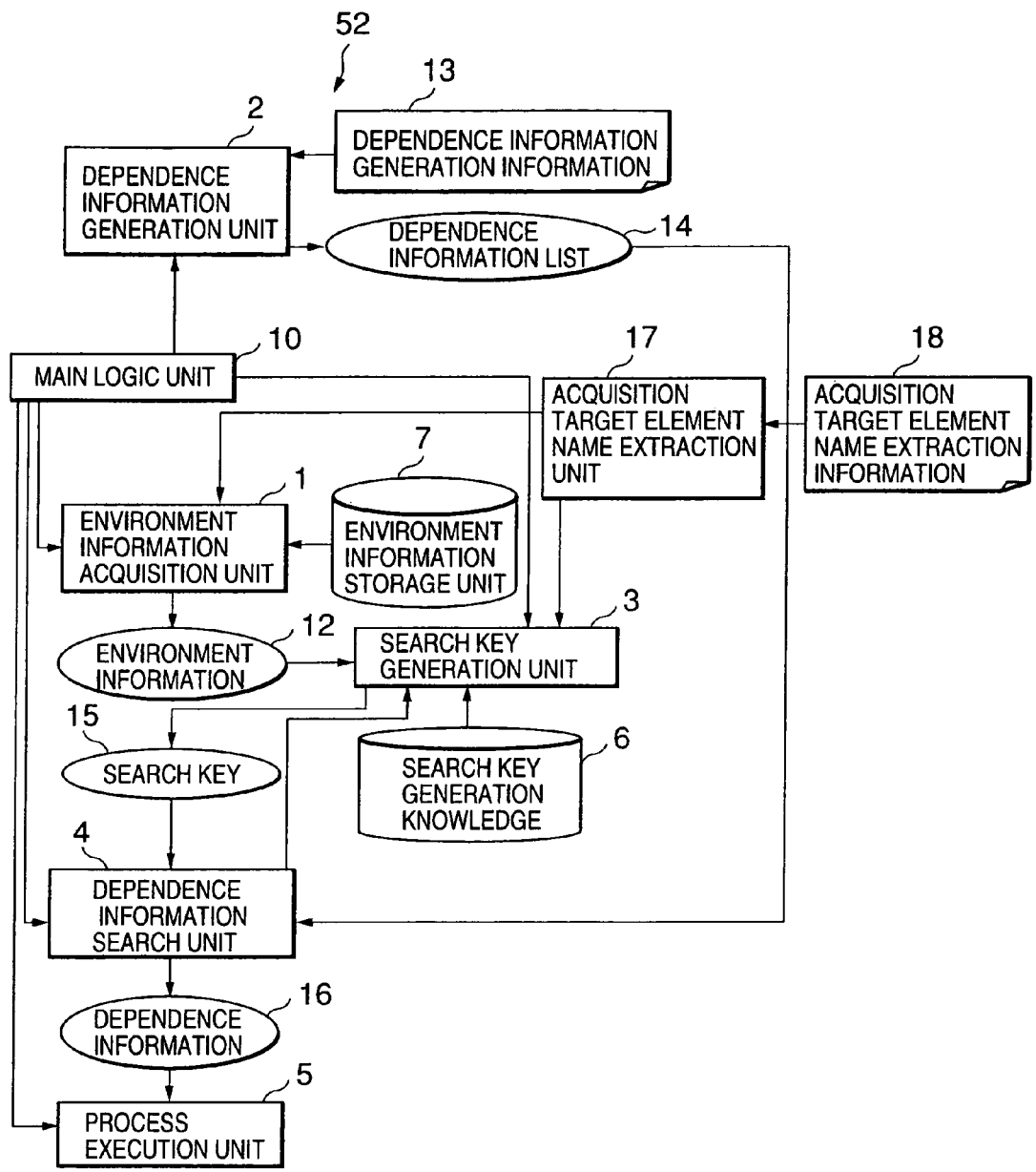
FIG. 3 is a functional block diagram showing another embodiment of the runtime environment dependency hiding apparatus shown in FIG. 1.

FIG. 3 shows another embodiment of a runtime environment dependent part hiding apparatus shown in FIGS. 1 and 2. This embodiment is substantially the same as that shown in FIGS. 1 and 2, except that an acquisition target element name indicating environment information to be acquired is dynamically extracted. In this embodiment, the same reference numerals denote the same parts as those in the embodiment shown in FIGS. 1 and 2, and a detailed explanation thereof will be omitted.

As shown in FIG. 3, an acquisition target element name extraction unit 17 dynamically extracts an acquisition target element name indicating environment information 12 to be acquired from the environment information storage unit 7 by the environment information acquisition unit 1 on the basis of acquisition target element name extraction information 18. The acquisition target element name extraction unit 17 receives, as the acquisition target element name extraction information 18, information indicating environment information to be acquired from a plurality of kinds of environment information (information that pertains to the vendor name of the VM, operating system name, WWW browser version, user name, or the like) stored in the environment information storage unit 7. Note that the acquisition target element name extraction information 18 is loaded as a text file via the input device such as a keyboard, or an argument upon starting a program. The acquisition target element name extraction information 18 may also be designated by the interactive operations of a user through a user interface. Then, the acquisition target element name extraction information 18 is stored on a recording medium such as a RAM, hard disk device, or the like.

Note that the acquisition target element name extracted by the acquisition target element name extraction unit 17 is input to the environment information acquisition unit 1, which acquires environment information 12 corresponding to that acquisition target element name from the environment information storage unit 7. The acquisition target element name is also input to the search key generation unit 3, which acquires search key generation knowledge 6 corresponding to that acquisition target element name, and generates a search key 15.

As described above, according to this embodiment, since an acquisition target element name indicating environment information 12 to be used upon selecting a dependence information candidate is separately prepared without being embedded in software, and the environment information 12 to be acquired is dynamically acquired upon execution, a part that depends on the runtime environment can be changed more easily.

EXAMPLES

Example 1

Examples of the runtime environment dependency hiding apparatus shown in FIGS. 1 and 2 will be explained in detail below with reference to FIGS. 4 to 8. In this example, a native method interface as a rule for making a program described in the Java language correspond to a program described in another language such as C, C++, or the like will be taken as an example of a part that depends on the runtime environment in a Java program, and a method of eliminating platform dependence of the native method interface will be explained. As described above, different native method interfaces are prepared in correspondence with the kinds of VMs. That is, when the VM to be used is the JDK VM provided by Sun Microsystems, Inc., a shared library corresponding to JNI (Java Native Interface) must be loaded; when the VM to be used is the MS VM available from Microsoft Corp., a shared library corresponding to RNI (Raw Native Interface) must be loaded.

Figure 4:
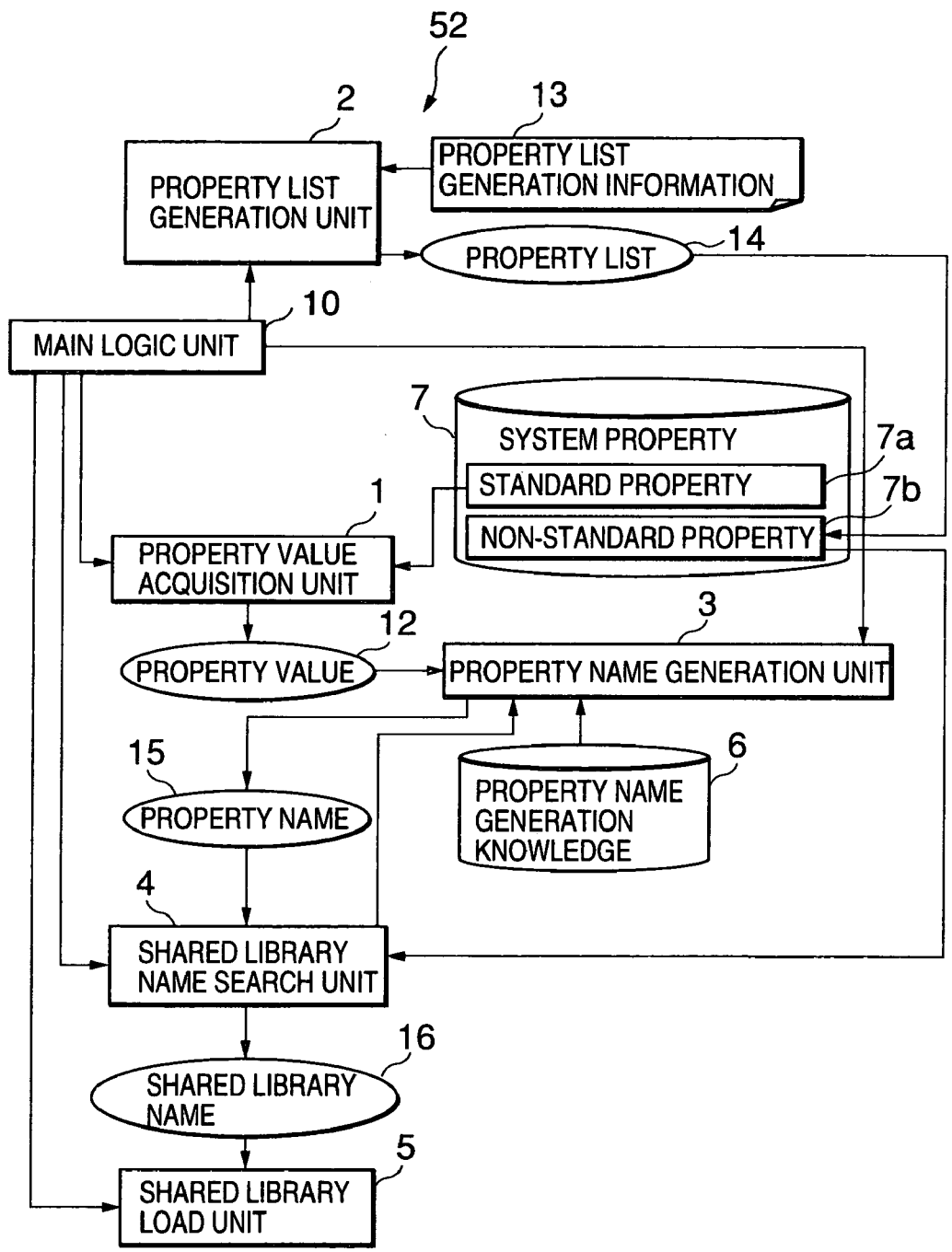
FIG. 4 is a functional block diagram showing an example of hiding platform dependence of a native method interface of a Java program by the runtime environment dependency hiding apparatus shown in FIG. 1.

As shown in FIG. 4, the runtime environment dependency hiding apparatus comprises a property value acquisition unit (environment information acquisition unit) 1, property list generation unit (dependence information generation unit) 2, property name generation unit (search key generation unit) 3, shared library name search unit (dependence information search unit) 4, and shared library load unit (process execution unit) 5, and these units are controlled by a main logic unit 10.

The property value acquisition unit 1 acquires environment information that pertains to the runtime environment of a Java program from standard properties 7a included in system properties 7. The standard properties 7a of the system properties 7 include a "java.vendor property, "os.name" property, and the like which store the vendor name of the VM, operating system name, and the like as character strings. From these standard properties 7a, the property value acquisition unit 1 acquires a property value 12 corresponding to the property name designated by the main logic unit 10 or an external input. More specifically, the property value 12 corresponding to the designated property name is acquired by a "getProperty" method of a "java.lang-.System" class contained in a standard class library of the Java language.

The property list generation unit 2 generates a property list (dependence information candidates) 14 required for processing a part that depends on the runtime environment in the Java program on the basis of property list generation information 13 loaded as a text file or an argument upon starting the program. The property list generation unit 2 receives, as the property list generation information 13, more than one set of a property name to be set as a non-standard property, and a shared library name of the native method interface as a part that depends on the runtime environment in the Java program. Note that the proper ty list 13 generated by the property list generation unit 2 is stored as non-standard properties 7b of the system properties 7 of the Java program.

The property name generation unit 3 generates a property name 15 to be retrieved in accordance with predetermined property name generation knowledge 6 on the basis of the property value 12 acquired by the property value acquisition unit 1. The property name generation unit 3 generates a property name 15 as a non-standard property name in the form of a character string as a combination of property values 12 acquired by the property value acquisition unit 1.

The shared library name search unit 4 searches the non-standard properties 7b of the system properties 7 for a shared library name 16 corresponding to the current runtime environment on the basis of the property name 15 to be retrieved generated by the property name generation unit 3. More specifically, when the VM that runs on the operating system is the JDK VM, a shared library name 16 corresponding to the JNI is retrieved; when the VM is the MS VM, a shared library name 16 corresponding to the RNI is retrieved.

The shared library load unit 5 implements loading of the shared library of the native method interface that matches the runtime environment on the basis of the shared library name 16 retrieved by the shared library name search unit 4. More specifically, the shared library corresponding to the shared library name 16 is loaded by a "loadLibrary" method of the "java.lang.System" class contained in the standard class library of the Java language.

Note that the runtime environment dependency hiding apparatus 52 with such arrangement can be implemented by software, and the implemented Java program can be built in a component such as a DVD (Digital Versatile Disk) player or the like.

Figure 5:
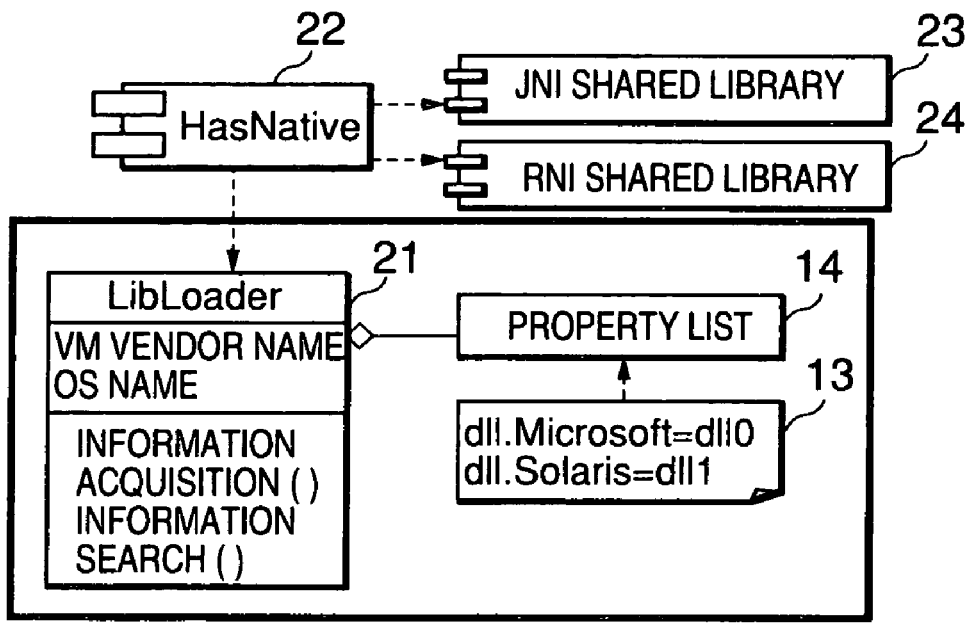
FIG. 5 shows a design pattern (class configuration) upon implementing the runtime environment dependency hiding apparatus shown in FIG. 4 by software.

FIG. 5 shows the design pattern (class configuration) upon implementing the runtime environment dependency hiding apparatus 52 shown in FIG. 4 by software. As shown in FIG. 5, this design pattern has a "LibLoader" class 21 that provides various methods for determining the shared library name to be loaded (one of a JNI shared library 23 and RNI shared library 24), and a "HasNative" class 22 for implementing an arbitrary native method depending on the runtime environment using this "LibLoader" class 21. Note that the "LibLoader" class 21 implements the functions of the property value acquisition unit 1, property list generation unit 2, property name generation unit 3, and shared library name search unit 4, and the "HasNative" class 22 implements the function of the shared library load unit 5.

The operation of the runtime environment dependency hiding apparatus 52 shown in FIGS. 4 and 5 will be explained below with reference to FIGS. 4 to 8. Note that FIG. 6 is an explanatory view showing an example of a runtime environment to which the runtime environment dependency hiding apparatus 52 shown in FIGS. 4 and 5 is applied, and FIGS. 7 and 8 are views for explaining the operation of the runtime environment dependency hiding apparatus shown in FIGS. 4 and 5.

Figure 6:
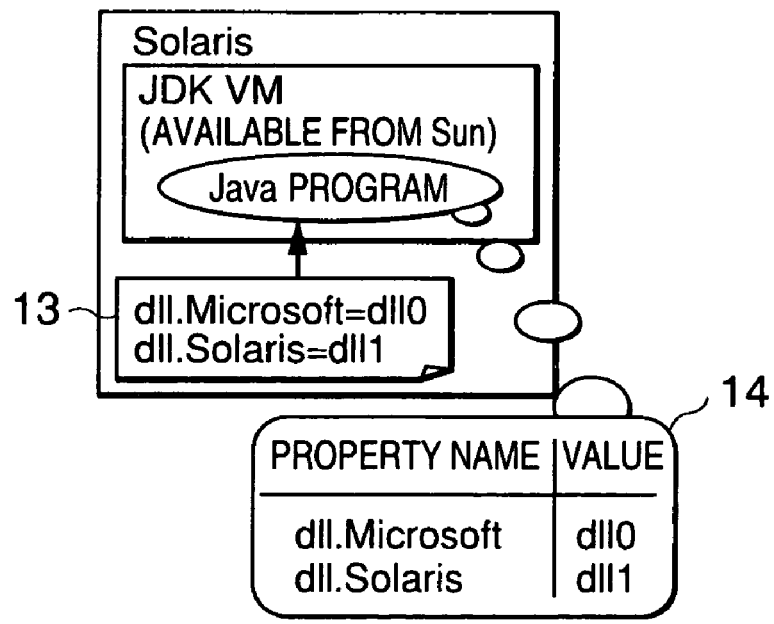
FIG. 6 is an explanatory view showing an example of a runtime environment to which a runtime environment dependency hiding apparatus using the design pattern shown in FIG. 5 is applied.

As shown in FIG. 6, the property list generation information 13 given as a text file contains two sets of property names to be set as non-standard properties, and the shared library names of the native method interfaces. Such information is loaded, and is stored as the non-standard properties 7b of the system properties 7. Assume that a Java program that contains a process depending on the runtime environment is executed by the JDK VM that runs on an operating system Solaris.

Figure 7:
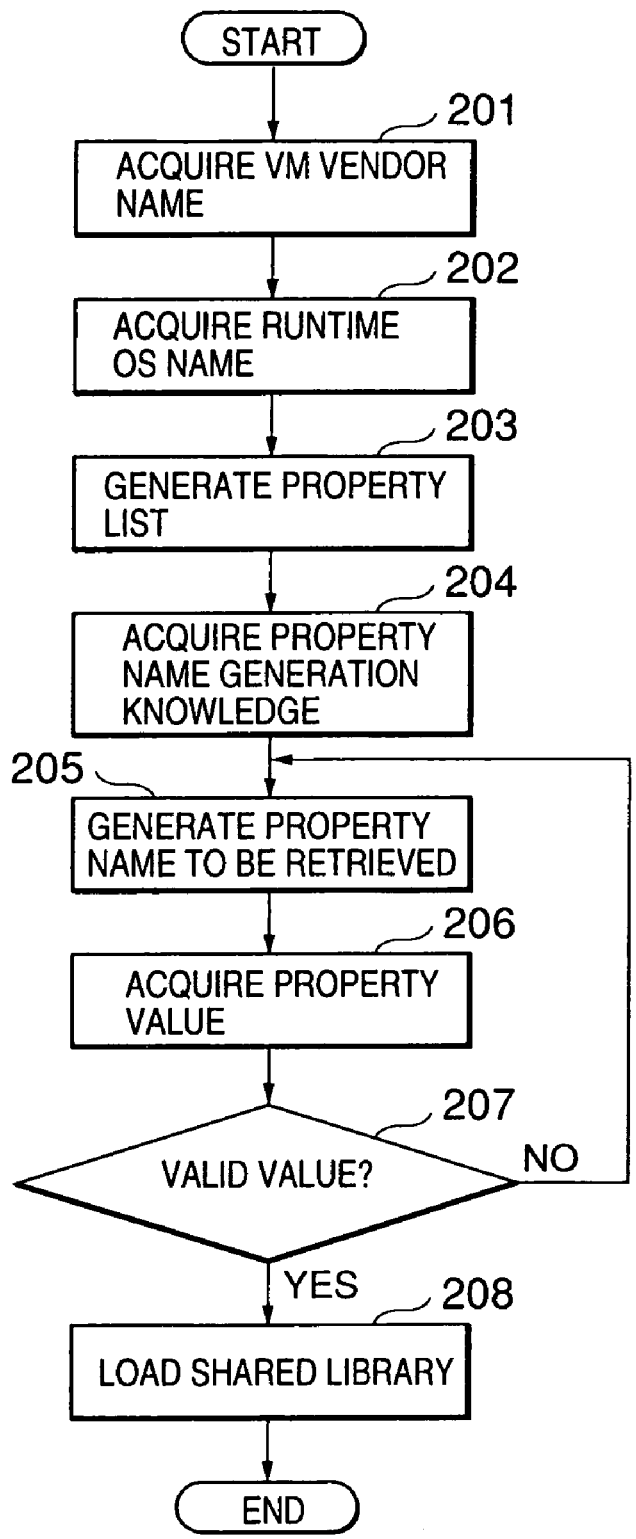
FIG. 7 is a flow chart for explaining the operation of the runtime environment dependency hiding apparatus shown in FIG. 4.
Figure 8:
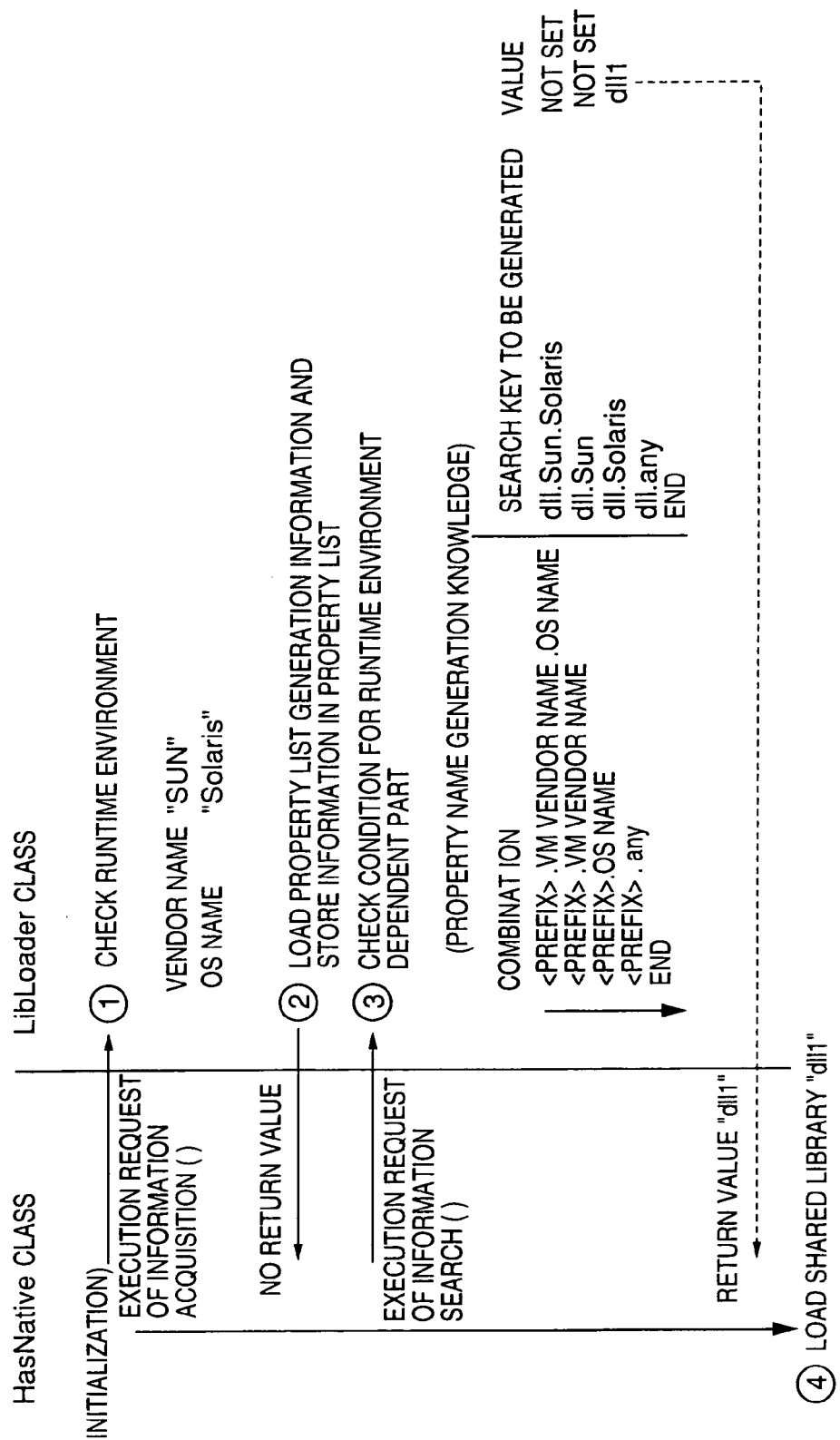
FIG. 8 is a view for explaining the operation of the runtime environment dependency hiding apparatus using the design pattern shown in FIG. 5.

As shown in FIG. 7, when the Java program is executed, the property value acquisition unit 1 acquires information pertaining to the vendor name of the VM corresponding to the runtime environment of the Java program from the standard properties 7a ("java.vendor" property) of the system properties 7 (step 201), and acquires information pertaining to the operating system name from the standard properties 7a ("os.name" property) of the system properties 7 (step 202). More specifically, in the example of the design pattern shown in FIG. 5, the "HasNative" class calls an information acquisition method of the "LibLoader" class to acquire character strings "SUN" (the vendor name of the VM) and "Solaris" (the operating system name) from the "java.vendor" property and "os.name" property as the standard properties, as shown FIG. 8.

Subsequently, the property list generation unit 2 generates a property list 14 required for processing a part that depends on the runtime environment in the Java program on the basis of the property list generation information 13 loaded as a text file or an argument upon starting the program, and holds the list as the non-standard properties 7b of the system properties 7 of the Java program (step 203). More specifically, in the example of the design pattern shown in FIG. 5, the information acquisition method of the "LibLoader" class loads the property list generation information 13, and stores the property list 14 shown in FIG. 6 as the non-standard properties 7b of the system properties of the Java program, as shown in FIG. 8.

The property name generation unit 3 acquires property name generation knowledge 6 (step 204), and then generates a property name 15 to be retrieved in accordance with the property name generation knowledge 6 on the basis of the property values 12 acquired by the property value acquisition unit 1 (step 205). More specifically, in the example of the design pattern shown in FIG. 5, the "HasNative" class calls an information search method of the "LibLoader" class (passes prefix "dll" as an argument), and sequentially generates property names to be retrieved in accordance with the property name generation knowledge 6 on the basis of the acquired character strings "SUN" and "Solaris", as shown in FIG. 8. In the example shown in FIG. 8, the property name generation knowledge 6 stores a predetermined rule for generating the property name to be retrieved by combining the acquired character strings, e.g., by appending "VM vendor name.OS name" after prefix "dll", so as to avoid repetitions with other applications. In this example, property names such as "dll.Sun.Solaris" and the like are generated as search keys.

The shared library name search unit 4 searches the property list 14, which is generated by the property list generation unit 2 and stored as the non-standard properties 7b of the system properties 7, for the shared library name 16 corresponding to the current runtime environment, on the basis of the property names 15 to be retrieved generated by the property name generation unit 3. More specifically, a property value corresponding to the property name 15 is acquired from the property list 14 (step 206), and it is then checked if this value is valid (step 207). In this way, a search is done in turn using the property names 15 generated by the property name generation unit 3 as search keys until a valid value (shared library name 16) is found (steps 205 to 207). That is, in the example of the design pattern shown in FIG. 5, as shown in FIG. 8, the information search method of the "LibLoader" class searches the property list 14 for a shared library name 16 corresponding to the current runtime environment, and returns a value to the "HasNative" class when the property name set with a valid value is found. In the example in FIG. 8, in case of the property list 14 shown in FIG. 6, the properties to be retrieved are "dll.Sun.Solaris", "dll.Solaris", and the like, and the property list 14 contains property names "dll.Microsoft" and "dll.Solaris". For this reason, by searching the property list 14 for the property name corresponding to the property name to be retrieved, the third generated property name ("dll.Solaris") in the example of FIG. 8 is found. Since the property corresponding to this property name ("dll.Solaris") is set with a value "dll1", this value "dll1" is returned to the "HasNative" class.

When a valid value (shared library name 16) is found, the shared library load unit 5 loads the shared library of the native method interface that matches the runtime environment on the basis of the shared library name 16 obtained by the shared library name search unit 4 (step 208). More specifically, in the example of the design pattern shown in FIG. 5, as shown in FIG. 8, the "HasNative" class loads the shared library "dll1" on the basis of the value returned from the "LibLoader" class.

Note that the processes in steps 201 to 204 are independent from each other, and can be executed in an arbitrary order or at the same time up to step 205.

As described above, according to this example, information that contains a set of information (the vendor name of the VM and operating system name) as a basis for switching decision, and the shared library name to be loaded is loaded as the property list 14 upon execution, and the shared library name that matches the current runtime environment is dynamically acquired from the property list 14 on the basis of the property value corresponding to the runtime environment of the Java program, even when the information as a basis for switching decision, the shared library name, and the like must be added/changed, the need for re-compiling of Java code can be obviated.

For this reason, for example, when another company (A company) other than Sun Microsystems, Inc. and Microsoft Corp. provides a new VM, the user who executes a Java program (application/applet) need only add a new property ("<prefix>.A company") in the property list generation information 13.

On the other hand, even when the shared library name to be loaded need be changed due to upgrading of the shared library or the like, since the shared library name is not directly written in Java code, the shared library name can be changed without re-compiling. More specifically, if the shared library name to be loaded when a given condition is satisfied is changed from "dll1" to two names "dll2" and "dll3", the description in the property list generation information 13 need only be changed from "dll.Solaris=dll1"

to

"dll.Solaris=dll2, dll3"

Since the property list generation information 13 that has been changed in this way is loaded as a property list 14 upon execution, and the shared library name to be loaded is determined based on this new property list 14, Java code requires no modifications.

Furthermore, the "LibLoader" class can be re-used as a part in the next development, thus improving the development efficiency of software.

Example 2

An example of the runtime environment dependency hiding apparatus shown in FIG. 3 will be explained below with reference to FIGS. 9 to 13. In this example as well, a native method interface will be taken as an example of a part that depends on the runtime environment in a Java program, and a method of eliminating platform dependence of the native method interface will be explained, as in the example shown in FIGS. 4 to 8.

Figure 9:
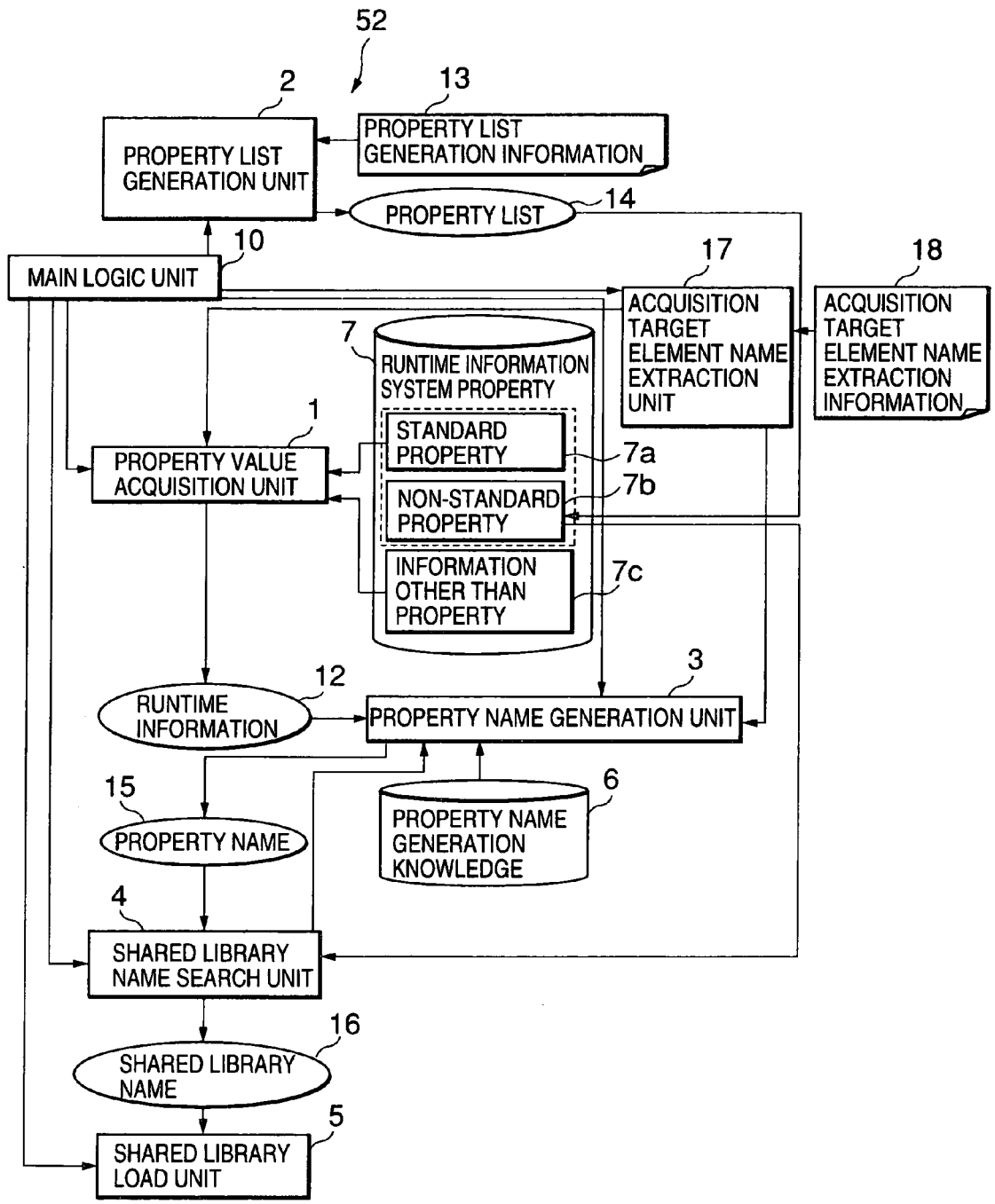
FIG. 9 is a functional block diagram showing an example of hiding platform dependence of a native method interface of a Java program by the runtime environment dependency hiding apparatus shown in FIG. 3.

As shown in FIG. 9, the runtime environment dependency hiding apparatus 52 comprises a runtime information acquisition unit (environment information acquisition unit) 1, property list generation unit (dependence information generation unit) 2, property name generation unit (search key generation unit) 3, shared library name search unit (dependence information search unit) 4, shared library load unit (process execution unit) 5, and acquisition target element name extraction unit 17, and these units are controlled by a main logic unit 10.

The runtime information acquisition unit 1 acquires environment information that pertains to the runtime environment of the Java program from the standard properties 7a included in runtime information 7, and information other than the properties. The standard properties 7a of the system properties 7 include a "java.vendor" property, "os.name" property, and the like which store the vendor name of the VM, operating system name, and the like as character strings. From these standard properties 7a, the runtime information acquisition unit 1 acquires a property value (runtime information) 12 corresponding to the property name designated by the main logic unit 10 or an external input. The information 7c other than the properties includes the WWW browser version, user name, or the like. Note that the WWW browser version can be acquired using an API (function/method group) peculiar to the browser, and can also be acquired on the basis of an actual implementation result of a given method.

The acquisition target element name extraction unit 17 dynamically extracts an acquisition target element name indicating runtime information 12 to be acquired from the runtime information 7 by the environment information acquisition unit 1 on the basis of acquisition target element name extraction information 18. The acquisition target element name extraction information 18 includes information indicating environment information to be acquired from information that pertains to the vendor name of the VM, operating system name, WWW browser version, user name, or the like contained in the runtime information 7.

Note that the arrangements other than the runtime information acquisition unit 1, i.e., the property list generation unit (dependence information generation unit) 2, property name generation unit (search key generation unit) 3, shared library name search unit (dependence information search unit) 4, shared library load unit (process execution unit) 5, and main logic unit 10 are the same as those in the example shown in FIGS. 4 to 8, and a detailed description thereof will be omitted.

Figure 10:
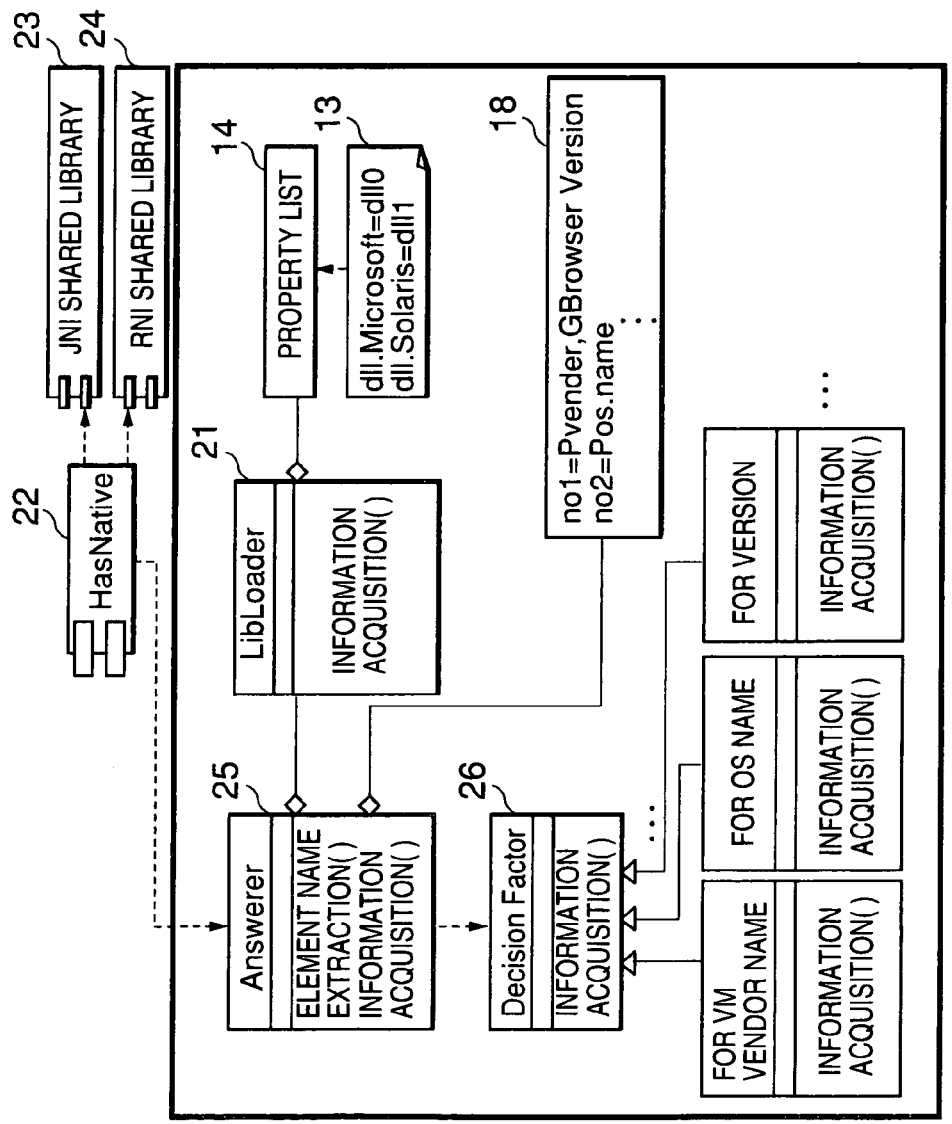
FIG. 10 shows a design pattern (class configuration) upon implementing the runtime environment dependency hiding apparatus shown in FIG. 9 by software.

FIG. 10 shows the design pattern (class configuration) upon implementing the runtime environment dependency hiding apparatus 52 shown in FIG. 9 by software. As shown in FIG. 10, this design pattern has an "Answerer" class 25 that provides a method for dynamically extracting an acquisition target element name, a "DecisionFactor" class 26 which is called by the "Answerer" class 25 and acquires environment information corresponding to the acquisition target element name, a "LibLoader" class 21 that provides a method for determining the shared library name to be loaded (one of a JNI shared library 23 and RNI shared library 24) on the basis of the environment information extracted by the "Answerer" class 25, and a "HasNative" class 22 for implementing an arbitrary native method depending on the runtime environment using this "Answerer" class 25.

Note that the "Answerer" class 25 implements the function of the acquisition target element name extraction unit 17, the "DecisionFactor" class 26 implements the function of the runtime information acquisition unit 1, the "LibLoader" class 21 implements the functions of the property name generation unit 3, and shared library name search unit 4, and the "HasNative" class 22 implements the function of the property list generation unit 2 and shared library load unit 5. Note that the function of the property list generation unit 2 can be implemented by the "LibLoader" class 21 instead of the "HasNative" class 22.

The operation of the runtime environment dependency hiding apparatus shown in FIGS. 9 and 10 will be explained below with reference to FIGS. 9 to 13. Note that FIG. 11 is an explanatory view showing an example of a runtime environment to which the runtime environment dependency hiding apparatus shown in FIGS. 9 and 10 is applied, and FIGS. 12 and 13 are views for explaining the operation of the runtime environment dependency hiding apparatus shown in FIGS. 9 and 10.

Figure 11:
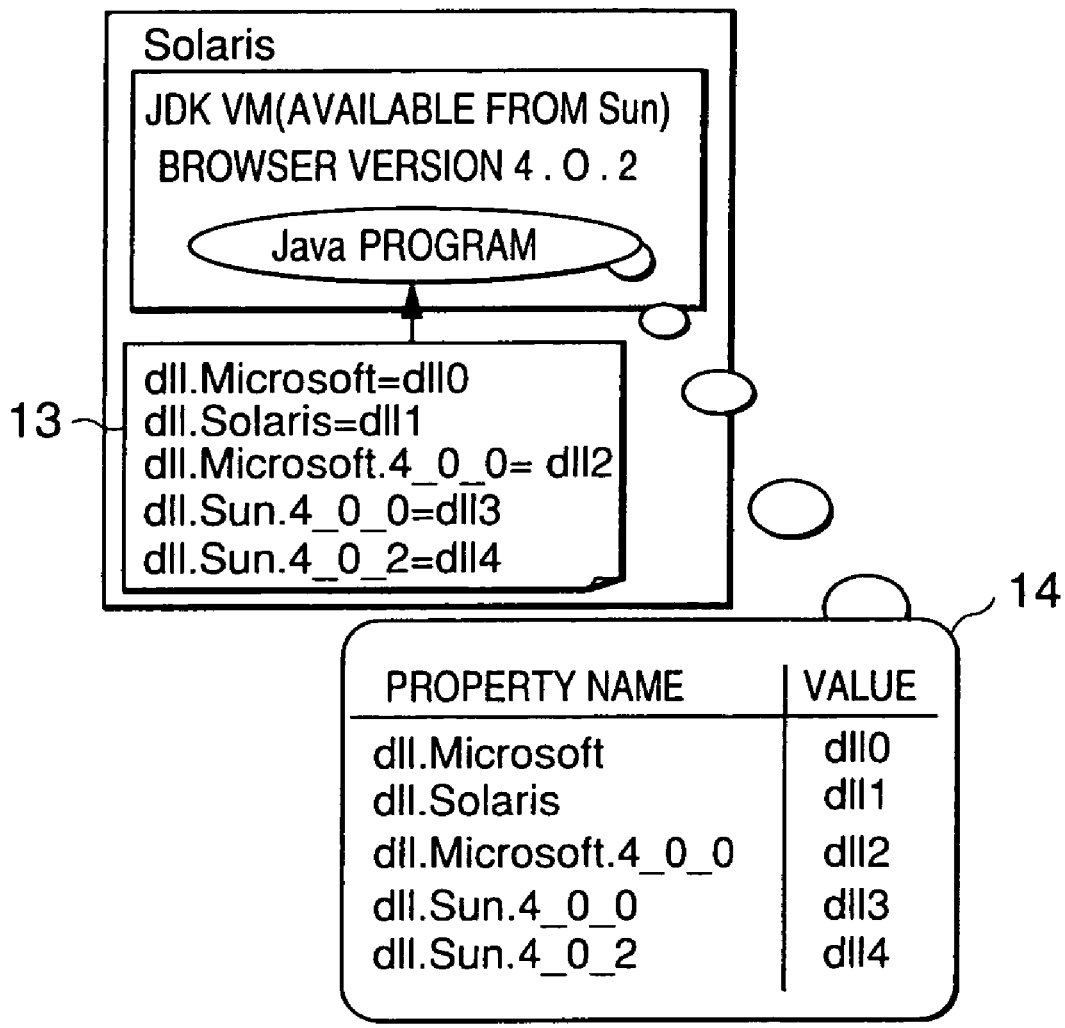
FIG. 11 is an explanatory view showing an example of a runtime environment to which a runtime environment dependency hiding apparatus using the design pattern shown in FIG. 10 is applied.

As shown in FIG. 11, the property list generation information 13 given as a text file contains five sets of property names to be set as non-standard properties, and the shared library names of the native method interfaces. Such information is loaded, and is stored as the non-standard properties 7b. Assume that a Java program that contains a process depending on the runtime environment is executed by the JDK VM that runs on an operating system Solaris, and that Java program runs on a WWW browser of version 4.0.2.

Figure 12:
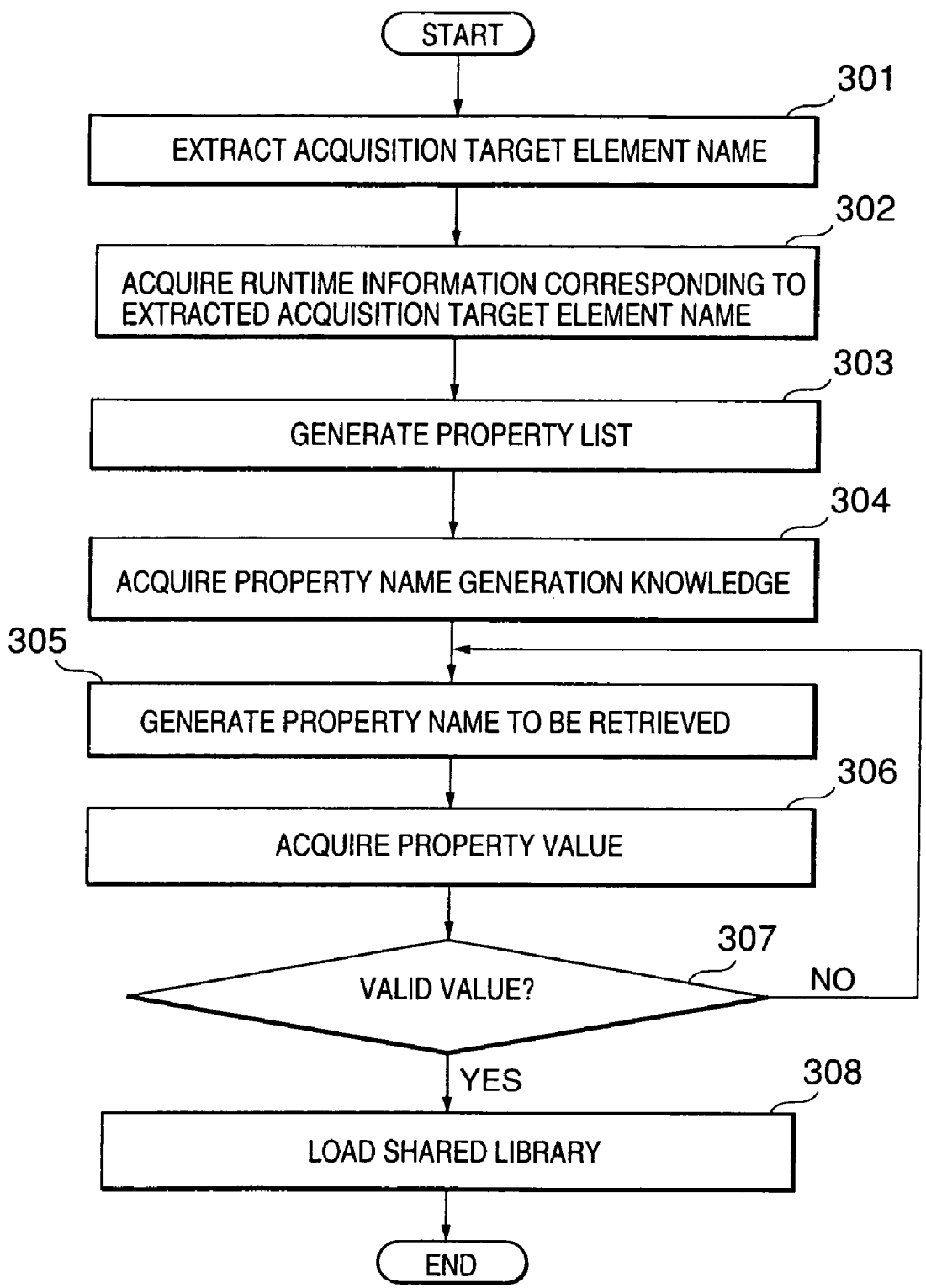
FIG. 12 is a flow chart for explaining the operation of the runtime environment dependency hiding apparatus shown in FIG. 9.
Figure 13:
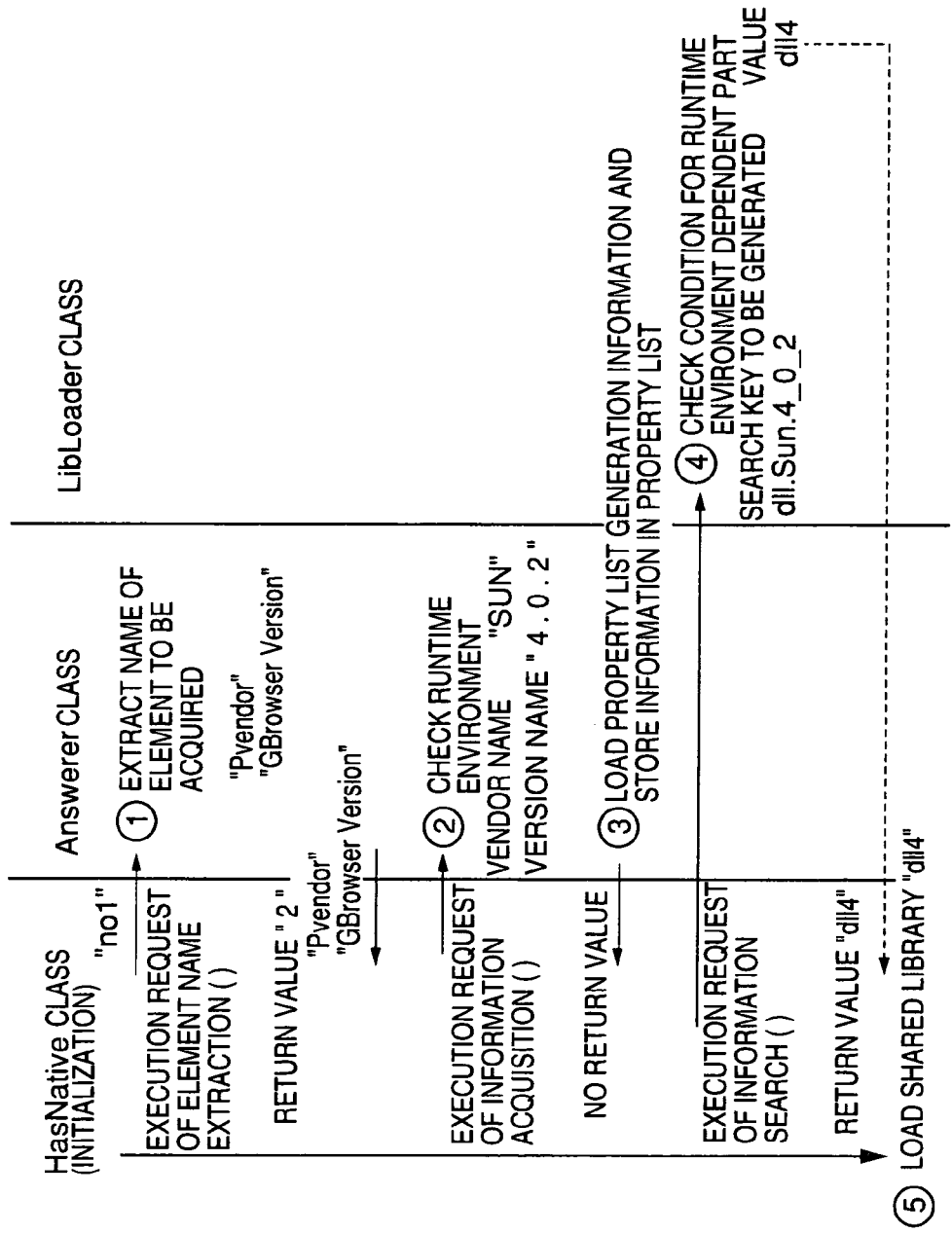
FIG. 13 is a view for explaining the operation of the runtime environment dependency hiding apparatus using the design pattern shown in FIG. 10.

As shown in FIG. 12, when the Java program is executed, the acquisition target element name extraction unit 7 dynamically extracts an acquisition target element name indicating runtime information 12 to be acquired on the basis of acquisition target element name extraction information 18 (step 301). The runtime information acquisition unit 1 acquires runtime information 12 corresponding to the extracted acquisition target element name (step 302). As shown in FIG. 10, when the acquisition target element name extraction information 18 contains information (Pvendor) that designates the vendor name of the VM, and information (GBrowserVersion) that designates the version of the WWW browser, information that pertains to the vendor name of the VM corresponding to the runtime environment of the Java program is acquired from the standard properties 7a ("java.vendor" property) of the runtime information 7, and information that pertains to the version of the WWW browser is acquired using an API (function/method group) peculiar to the browser. More specifically, in the example of the design pattern shown in FIG. 10, as shown in FIG. 13, the "HasNative" class calls an element name extraction method of the "Answerer" class to acquire character strings "Pvendor" (the vendor name of the VM) and "GBrowserVersion" (the version of the WWW browser), and also calls information acquisition methods of subclasses (VM vendor subclass and version subclass) under the "DecisionFactor" class to acquire character strings "SUN" (the vendor name of the VM) and "4_0_2" (the version of the WWW browser) using the "java.vendor" property as the standard property and an API (function/method group) peculiar to the browser.

The property list generation unit 2 generates a property list 14 required for processing a part that depends on the runtime environment in the Java program on the basis of the property list generation information 13 loaded as a text file or an argument upon starting the program, and saves the list as non-standard properties 7b of the runtime information 7 of the Java program (step 303). More specifically, in the example of the design pattern shown in FIG. 10, as shown in FIG. 13, the information acquisition method of the "Answerer" class loads the property list generation information 13, and stores the property list 14 shown in FIG. 11 as the non-standard properties 7b of the runtime information 7 of the Java program.

The property name generation unit 3 acquires a property name generation knowledge 6 (step 304), and generates property names 15 to be retrieved in accordance with the property name generation knowledge 6 on the basis of the runtime information 12 acquired by the runtime information acquisition unit 1 (step 305). More specifically, in the example of the design pattern shown in FIG. 10, as shown in FIG. 13, the "HasNative" class calls the information search method of the "LibLoader" class (passes prefix "dll" as an argument) to sequentially generate property names to be retrieved in accordance with the property name generation knowledge 6 on the basis of the acquired character strings "SUN" and "4_0_2". In the example shown in FIG. 13, the property name generation knowledge 6 stores a predetermined rule for generating the property name to be retrieved by combining the acquired character strings, e.g., by appending "VM vendor name.browser version" after prefix "dll", so as to avoid repetitions with other applications. In this example, a property name "dll.Sun.4_0_2" is generated as a search key.

The shared library name search unit 4 searches the property list 14, which is generated by the property list generation unit 2 and stored as the non-standard properties 7b of the runtime information 7, for the shared library name 16 corresponding to the current runtime environment, on the basis of the property name 15 to be retrieved generated by the property name generation unit 3. More specifically, a property value corresponding to the property name 15 is acquired from the property list 14 (step 306), and it is then checked if this value is valid (step 307). In this way, a search is done in turn using the property names 15 generated by the property name generation unit 3 as search keys until a valid value (shared library name 16) is found (steps 305 to 307). That is, in the example of the design pattern shown in FIG. 10, as shown in FIG. 13, the information search method of the "LibLoader" class searches the property list 14 for a shared library name 16 corresponding to the current runtime environment, and returns a value to the "HasNative" class when the property name set with the valid value is found. In the example in FIG. 13, in case of the property list 14 shown in FIG. 11, the property to be retrieved is "dll.Sun.4_0_2", and the property list 14 contains property names "dll.Microsoft.4_0_0", "dll.Sun.4_0_0", and "dll.Sun.4_0_2". For this reason, by searching the property list 14 for the property name corresponding to the property name to be retrieved, the third generated property name ("dll.Sun.4_0_2") in the example of FIG. 13 is found. Since the property corresponding to this property name ("dll.Sun.4_0_2") is set with a value "dll4", this value "dll4" is returned to the "HasNative" class.

When a valid value (shared library name 16) is found, the shared library load unit 5 loads the shared library of the native method interface that matches the runtime environment on the basis of the shared library name 16 obtained by the shared library name search unit 4 (step 308). More specifically, in the example of the design pattern shown in FIG. 10, as shown in FIG. 13, the "HasNative" class loads the shared library "dll4" on the basis of the value returned from the "LibLoader" class via the "Answerer" class.

Note that, of the processes in steps 301 to 304 described above, the processes in steps 301 and 302 are dependent on each other and it is necessary to execute step 301 before step 302. However, the processes in steps 301–302, 303 and 304 are independent from each other, and can be executed in an arbitrary order or at the same time up to step 305.

As described above, according to this example, since the acquisition target element name extraction information 18 that contains an acquisition target element name indicating runtime information 12 to be used upon switching decision of the shared library is loaded upon execution, even when the runtime information 12 as a basis for switching decision is added/changed, the need for re-compiling Java code can be obviated.

For this reason, for example, even when the user name is required in place of the version of the WWW browser as the runtime information 12 used upon switching decision of the shared library, the user who executes the Java program (application/applet) need only change the description of the acquisition target element name extraction information 18 from "no1=Pvendor.GBrowserVersion"

to

"no1=Pvendor.GUser".

To restate, according to the present invention, since dependence information candidates, which are required for processing a part that depends on the runtime environment in software, are separately prepared without being embedded in software, and dependence information corresponding to the current runtime environment is dynamically acquired from the dependence information candidates on the basis of environment information that pertains to the runtime environment of software, the part that depends on the runtime environment can be easily changed, and necessity of re-compiling can be avoided, thus improving maintenance and re-usability of software.

Also, according to the present invention, since an acquisition target element name indicating environment information to be used upon selecting a dependence information candidate is separately prepared without being embedded in software, and environment information to be acquired is dynamically acquired upon execution, the part that depends on the runtime environment can be more easily changed.

What is claimed is:

1. A runtime environment dependency hiding apparatus comprising:
   an environment information acquisition unit for acquiring environment information that pertains to a computer system on which software runs;
   a dependence information generation unit for generating at least one dependence information candidate required for processing a part that depends on the runtime environment on the basis of externally loaded dependence information generation information that is prepared separately from the software, wherein the dependence information candidate is dynamically acquired in accordance with the runtime environment;
   a dependence information search unit for searching the dependence information candidate for dependence information that pertains to the current runtime environment on the basis of the environment information; and
   a process execution unit for executing the processing of the part that depends on the runtime environment on the basis of the dependence information.

2. The apparatus according to claim 1, further comprising a search key generation unit for generating a search key in accordance with predetermined search generation knowledge on the basis of the environment information acquired by said environment information acquisition unit,
   wherein said dependence information search unit searches the dependence information candidate generated by said dependence information generation unit for dependence information corresponding to the current runtime environment on the basis of the search key generated by said search key generation unit.

3. The apparatus according to claim 1, wherein said environment information acquisition unit acquires the environment information from a system property managed by the software.

4. The apparatus according to claim 1, wherein said environment information acquisition unit acquires the environment information by an external input.

5. The apparatus according to claim 2, wherein said dependence information generation unit stores the dependence information candidate as a property list, and said search key generation unit generates a property name as the search key.

6. A runtime environment dependency hiding apparatus comprising:
   an environment information acquisition unit for acquiring environment information that pertains to a runtime environment of software that runs on a computer system;
   a dependence information generation unit for generating at least one dependence information candidate required for processing a part that depends on the runtime environment in the software on the basis of externally loaded generation information that is prepared separately from the software;
   a dependence information search unit for searching the dependence information candidate generated by the dependence information generation unit for dependence information that pertains to the current runtime environment on the basis of the environment information acquired by the environment information acquisition unit;
   a process execution unit for executing the processing of the part that depends on the runtime environment on the basis of the dependence information obtained by the dependence information search unit; and
   a search key generation unit for generating a search key in accordance with predetermined search generation knowledge on the basis of the environment information acquired by the environment information acquisition unit,
   wherein the dependence information search unit searches the dependence information candidate generated by the dependence information generation unit for dependence information corresponding to the current runtime environment on the basis of the search key generated by the search key generation unit, and
   wherein the search key generation unit generates as the search key a character string consisting of the environment information acquired by the environment information acquisition unit.

7. The apparatus according to claim 1, wherein the software is a program executed by a virtual machine which runs on an operating system.

8. The apparatus according to claim 7, wherein the environment information contains information which pertains to a vendor name of the virtual machine corresponding to the runtime environment of the program or an operating system name.

9. The apparatus according to claim 7, wherein the dependence information contains information which pertains to a shared library name of a native method interface as the part that depends on the runtime environment in the program.

10. The apparatus according to claim 1, further comprising an acquisition target element name extraction unit for extracting an acquisition target element name indicating environment information to be acquired,
    wherein said environment information acquisition unit acquires environment information corresponding to the acquisition target element name extracted by said acquisition target element name extraction unit.

11. A runtime environment dependency hiding method comprising the steps of:
    acquiring environment information that pertains to a computer system on which software runs;
    generating at least one dependence information candidate required for processing a part that depends on the runtime environment in the software on the basis of externally loaded dependence information generation information that is prepared separately from the software, wherein the dependence information candidate is dynamically acquired in accordance with the runtime environment;
    searching the generated dependence information candidate for dependence information that pertains to a current runtime environment on the basis of the acquired environment information; and executing the processing of the part that depends on the runtime environment on the basis of the dependence information.

12. The method according to claim 11, further comprising a step of generating a search key in accordance with predetermined search generation knowledge on the basis of the acquired environment information, wherein the step of searching the dependence information includes the step of searching the generated dependence information candidate for dependence information corresponding to the current runtime environment on the basis of the generated search key.

13. The method according to claim 11, further comprising a step of extracting an acquisition target element name indicating environment information to be acquired, wherein the step of acquiring the environment information acquires environment information corresponding to the extracted acquisition target element name.

14. A computer readable recording medium recording a runtime environment dependency hiding program, which comprises computer sequences of:

acquiring environment information that pertains to a computer system on which a software runs;

generating at least one dependence information candidate required for processing a part that depends on the runtime environment in the software on the basis of externally loaded dependence information generation information that is prepared separately from the software, wherein the dependence information candidate is dynamically acquired in accordance with the runtime environment; and searching the generated dependence information candidate for dependence information that pertains to the current runtime environment on the basis of the acquired environment information.

15. The medium according to claim 14, wherein said program further comprises a computer sequence of generating a search key in accordance with predetermined search generation knowledge on the basis of the acquired environment information, wherein the sequence of searching the dependence information includes a sequence of searching the generated dependence information candidate for dependence information corresponding to the current runtime environment on the basis of the generated search key.

16. The medium according to claim 14, wherein said program further comprises a computer sequence of executing the processing of the part that depends on the runtime environment on the basis of the obtained dependence information.

17. The medium according to claim 14, wherein the sequence of acquiring the environment information includes a sequence of acquiring the environment information from a system property managed by the software.

18. The medium according to claim 14, wherein the sequence of acquiring the environment information includes a sequence of acquiring the environment information by an external input.

19. The medium according to claim 15, wherein the sequence of generating the dependence information includes a sequence of storing the dependence information candidate as a property list, and the sequence of generating the search key includes a sequence of generating a property name as the search key.

20. A computer readable recording medium recording a runtime environment dependency hiding program, which comprises computer sequences of:

acquiring environment information that pertains to a runtime environment of software that runs on a computer system;

generating at least one dependence information candidate required for processing a part that depends on the runtime environment in the software on the basis of externally loaded generation information that is prepared separately from the software; and searching the generated dependence information candidate for dependence information that pertains to the current runtime environment on the basis of the acquired environment information, wherein the program further comprises a computer sequence of generating a search key in accordance with predetermined search generation knowledge on the basis of the acquired environment information, wherein the sequence of searching the dependence information includes a sequence of searching the generated dependence information candidate for dependence information corresponding to the current runtime environment on the basis of the generated search key, and wherein the sequence of generating the search key includes a sequence of generating as the search key a character string consisting of the acquired environment information.

21. The medium according to claim 14, wherein the software is a program executed by a virtual machine which runs on an operating system.

22. The medium according to claim 21, wherein the environment information contains information which pertains to a vendor name of the virtual machine corresponding to the runtime environment of the program or an operating system name.

23. The medium according to claim 21, wherein the dependence information contains information which pertains to a shared library name of a native method interface as the part that depends on the runtime environment in the program.

24. The medium according to claim 14, wherein said program further comprises a computer sequence of extracting an acquisition target element name indicating environment information to be acquired, wherein the sequence of acquiring the environment information includes a sequence of acquiring environment information corresponding to the extracted acquisition target element name.

25. The apparatus according to claim 6, wherein said character string consists of at least two pieces of the environment information.

26. The method according to claim 11, wherein the step of acquiring the environment information includes a step of acquiring the environment information from a system property managed by the software.

27. The method according to claim 11, wherein the step of acquiring the environment information includes a step of acquiring the environment information by an external input.

28. The method according to claim 12, wherein the step of generating the dependence information includes a step of storing the dependence information candidate as a property list, and the step of generating the search key includes a step of generating a property name as the search key.

29. A runtime environment dependency hiding method comprising the steps of:

acquiring environment information that pertains to a runtime environment of software that runs on a computer system;

generating at least one dependence information candidate required for processing a part that depends on the runtime environment in the software on the basis of externally loaded generation information that is prepared separately from the software;

searching the generated dependence information candidate for dependence information that pertains to a current runtime environment on the basis of the acquired environment information;

executing the processing of the part that depends on the runtime environment on the basis of the obtained dependence information; and generating a search key in accordance with predetermined search generation knowledge on the basis of the acquired environment information, wherein the step of searching the dependence information includes the step of searching the generated dependence information candidate for dependence information corresponding to the current runtime environment on the basis of the generated search key, and wherein the step of generating the search key includes a step of generating as the search key a character string consisting of the acquired environment information.

30. The method according to claim 29, wherein said character string consists of at least two pieces of the environment information.

31. The method according to claim 11, wherein the software is a program executed by a virtual machine which runs on an operating system.

32. The method according to claim 31, wherein the environment information contains information which pertains to a vendor name of the virtual machine corresponding to the runtime environment of the program or an operating system name.

33. The method according to claim 31, wherein the dependence information contains information which pertains to a shared library name of a native method interface as the part that depends on the runtime environment in the program.

34. The medium according to claim 20, wherein said character string consists of at least two pieces of the environment information.

* * * * *